No. 713,586. Patented Nov. 18, 1902.
R. ARNO.
FILAMENT FOR INCANDESCENT ELECTRIC LAMPS KNOWN AS NERNST LAMPS.
(Application filed Feb. 8, 1900.)
(No Model.)

Witnesses:
Inventor,
Riccardo Arno.

UNITED STATES PATENT OFFICE.

RICCARDO ARNO, OF MILAN, ITALY.

FILAMENT FOR INCANDESCENT ELECTRIC LAMPS KNOWN AS NERNST LAMPS.

SPECIFICATION forming part of Letters Patent No. 713,586, dated November 18, 1902.

Application filed February 8, 1900. Serial No. 4,516. (No model.)

*To all whom it may concern:*

Be it known that I, RICCARDO ARNO, a subject of the King of Italy, residing at 3 Via Quintino Sella, Milan, Italy, have invented certain new and useful Improvements in Filaments for Incandescent Electric Lamps Known as Nernst Lamps; and I do hereby declare the following to be a full, clear, and exact description of the invention, such as will enable others skilled in the art to which it appertains to make and use the same.

Filaments composed of second-class conductors that are under ordinary conditions poor conductors of electricity and when hot become good conductors or are good conductors of high-tension currents have usually been made of cylindrical form connected at each extremity to monophase circuits.

My invention relates to the improvement of such filaments, giving them a suitable form, so that they can be used with alternating and polyphase systems and load such uniformly.

Figure 1:
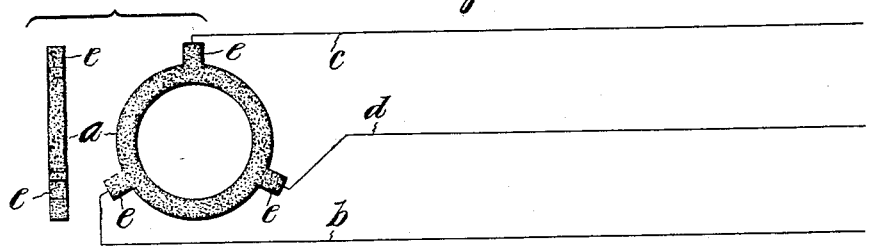
Figure 2:
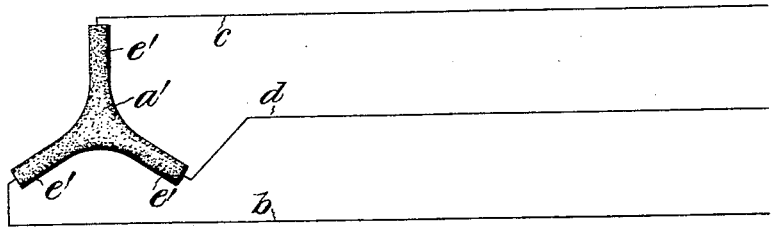

Referring to the drawings, in which like parts are similarly designated, Figure 1 shows a form of filament connected to a three-phase system. Fig. 2 is a modified form of filament.

In order to give as good an illumination as possible, I give such filaments a regular geometrical form symmetrical with respect to a vertical axis or any other suitable form, such that the axis thereof will be perpendicular to the floor of the place to be lighted. I preferably, though not necessarily, make these filaments in the form of rings $a$, and such circular filament $a$ is shown connected at symmetrically-arranged points to suitable lighting-mains. In Fig. 1 this ring or body portion $a$ is shown connected at points symmetrically arranged with respect to its axis to a polyphase system, the special type of such system here illustrated by way of example being a three-phase. These ring filaments $a$ are formed with terminal projections $e$, to which each of the wires of the system is connected.

It is well known that the relative values of the current in the several conductors of a polyphase system are so interdependent that a satisfactory regulation can only be obtained when the circuits are symmetrically loaded, a result easily arrived at when driving motors whose structure is such as to produce automatically such symmetry; but this is not the case with electric-light plants, as an equal or equivalent number of lamps must be inserted in each of the circuits of a polyphase system.

With the filament that forms the object of this invention—that is, one that is of a symmetrical form—it is only necessary to provide such with a number of terminals equal to the number of mains carrying the polyphase current and connecting each terminal to a main in order to symmetrically load the system.

In Fig. 1 I have shown a ring-shaped incandescible body $a$, provided with three equidistant terminals $e$, each connected to a main $b\ c\ d$ of a three-phase system.

In Fig. 2 I have shown a body portion $a'$ symmetrical with respect to center and of spider form, having a general triangular shape, each leg $e'$ forming a terminal and connected to one of the mains $b\ c\ d$ of a three-phase system. Thus it will be seen that when such and similar symmetrical filaments are suspended their axes of symmetry will be perpendicular to the area to be lighted.

Having now described my invention, what I claim as new therein, and desire to secure by Letters Patent, is—

1. An incandescent filament comprising a flat body composed of a conductor of the second class, three equidistant terminals forming part thereof and adapted to be connected to a three-phase line to symmetrically load the same, substantially as described.

2. An incandescent filament comprising a flat annular body composed of conductors of the second class, three equidistant terminals forming part of the annular body, in combination with a three-phase line, each wire of which is respectively connected to a terminal of said filament, substantially as described.

In testimony whereof I affix my signature in presence of two witnesses.

RICCARDO ARNO.

Witnesses:
GIACOMO GUARNIERI,
VIRGINIO CARNEVALI.